No. 836,007. PATENTED NOV. 13, 1906.
E. BIPPART.
SUBSOIL PLOW.
APPLICATION FILED MAY 4, 1906.

Witnesses:
J. P. Davis
C. E. Holste

Inventor:
Ernst Bippart
by Munn & Co
Attorneys.

UNITED STATES PATENT OFFICE.

ERNST BIPPART, OF ARNSTADT, IN THURINGIA, GERMANY.

SUBSOIL-PLOW.

No. 836,007.  Specification of Letters Patent.  Patented Nov. 13, 1906.

Application filed May 4, 1906. Serial No. 315,158.

*To all whom it may concern:*

Be it known that I, ERNST BIPPART, a citizen of the Empire of Germany, residing at Arnstadt, in Thuringia, Germany, have invented a new and useful Subsoil-Plow, of which the following is a specification.

There are known subsoil-plows each composed of a vertical metallic plate in the direction of the draft and of a not bent or curved share attached to the vertical plate, the cutting edge of this share being behind the front edge of the plate and being placed at right angles to the latter. Such plows are intended for avoiding an objectionable pressure of the soil in the cross-direction and for reducing the resistance of the soil during the motion of the share. However, I have found that with such subsoil-plows the resistance of the soil may under circumstances become very large—for example, if there are roots in the soil. Furthermore, such subsoil-plows may also fail to work properly in a bouldery soil or in a soil full of stones.

My invention relates to improvements in subsoil-plows whereby they are enabled to better and more easily cut through or to push aside roots in the soil. The improved subsoil-plows will also be able to work properly in a bouldery soil or in a soil full of stones.

The objects of my improvement are, first, to place the cutting edge of the share slantingly with regard to the direction of the draft; second, to so incline the whole share or the greater part of it that it slopes both forward to the cutting edge and from the vertical plate to a side in the cross-direction; third, to provide a support for connecting the share with the vertical plate; fourth, to provide beneath the support two horizontal guiding-bars adapted to slide on the bottom of the furrow, and, fifth, if so preferred, to provide the point of the vertical plate with a chisel. I attain these objects by the constructions illustrated in the accompanying drawings, in which—

Figure 1:
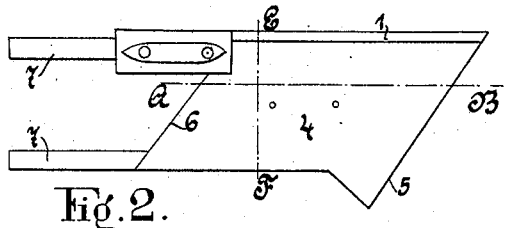
Figure 2:
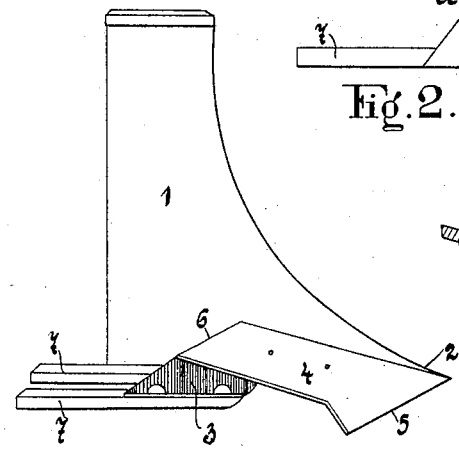
Figure 3:
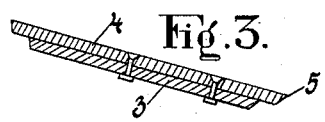
Figure 5:
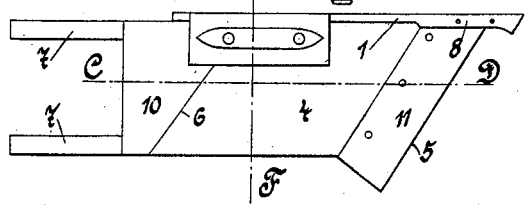
Figure 4:
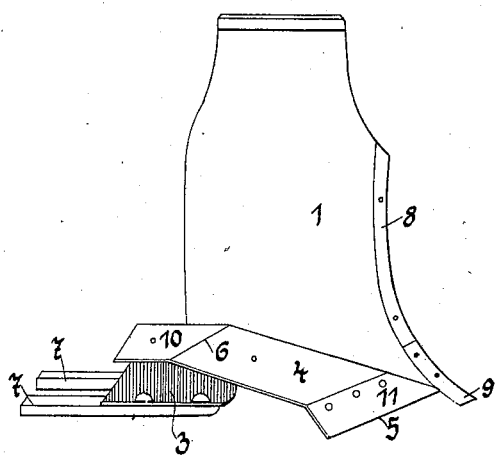
Figure 7:
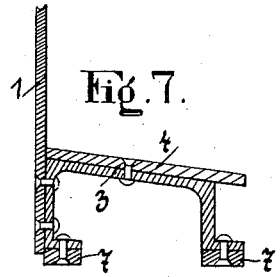
Figure 6:
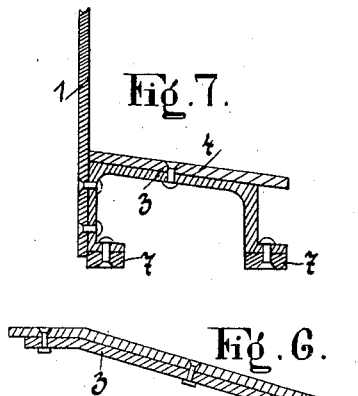

Figure 1 is a perspective view of a subsoil-plow. Fig. 2 is a plan of the same. Fig. 3 is a vertical section through the line A B in Fig. 2. Fig. 4 is a perspective view of a modification of the subsoil-plow. Fig. 5 is a plan of the same. Fig. 6 is a vertical section through the line C D in Fig. 5, and Fig. 7 is a vertical cross-section on an enlarged scale through the line E F in Fig. 2 or 5.

Similar characters of reference refer to similar parts throughout the several views.

The vertical plate 1 of the subsoil-plow (shown at Fig. 1) is placed in the direction of the draft and the lower part of its front edge is extended forwardly to form a point 2. The whole share 4 is made plain and is so inclined that it slopes not only forward, but also in the cross-direction from the vertical plate 1 to the side, as is clearly shown at Figs. 1 to 3. The cutting edge 5 is placed at an angle to the direction of draft. The rear edge 6 of the share 4 is shown as parallel to the cutting edge 5. The share 4 may be supported in any known manner—for example, by means of a support 3, (shown at Fig. 7,) which support 3 is made from sheet metal by bending it four times and may be attached to the vertical plate 1 by means of rivets or screws. Preferably two horizontal guiding-bars 7 7 may be disposed for regulating the depth to which the plow is to dig in the ground. These two guiding-bars 7 7 may be rigidly connected with the bottom flanges of the support 3 and, if so preferred, also with the vertical plate 1 by means of rivets or the like.

The improved subsoil-plow will be able to better cut through roots in the soil or to push them aside, since the cutting edge 5 is placed slantingly. The soil cut off by the cutting edge 5 will be raised only by the inclined share 4 and will be crumbed. The sloping share 4 will work somewhat like a wedge and will be able to dig even into a bouldery soil or a soil full of stones in a similar manner as an ordinary plow. To facilitate this work, the front edge of the vertical plate 1 may be strengthened with a strip of metal 8, which terminates in a chisel 9, as is shown at Fig. 4.

The soil cut off by the cutting edge 5 and raised by the inclined share 4 will drop from the rear edge 6. As the corner between the vertical plate 1 and the slanting rear edge 6 of the share 4 may be blocked up by the dropping soil, it may be preferable to supplement the share 4 by a horizontal piece 10, which projects beyond the rear edge of the vertical plate 1, as is shown at Fig. 4. Thereby a blocking up of the plow will be prevented, as the divided and crumbed soil can freely drop over the rear edge of the piece 10. Of course the share 4 may be made in one piece with the plate 10, it being made from sheet metal and bent in the line 6. The share 4 may be provided with a separate blade 11, having the cutting edge 5, as is shown in Figs. 4 and 5.

I claim—

1. In a subsoil-plow, the combination with a vertical metallic plate pointed on the lower part of its front edge and adapted to cut the soil in the direction of draft, of a support attached to a side of said vertical metallic plate, a plain share on said support behind the point of said vertical metallic plate and provided with a cutting edge at an angle to the direction of draft, it being made to slope both forward to the cutting edge and from the vertical metallic plate in the cross-direction, and two horizontal guiding-bars adapted to slide on the bottom of the furrow.

2. In a subsoil-plow, the combination with a vertical metallic plate pointed on the lower part of its front edge and adapted to cut the soil in the direction of draft, of a support attached to a side of said vertical metallic plate, a substantially plain share on said support behind the point of said vertical metallic plate and provided with a cutting edge at an angle to the direction of draft, it being made to slope both forward to the cutting edge and from the vertical metallic plate in the cross-direction and its rear part projecting beyond the rear edge of said vertical metallic plate being alone bent horizontally, and two horizontal guiding-bars adapted to slide on the bottom of the furrow.

In testimony whereof I have signed my name to this specification in the presence of two subscribing witnesses.

ERNST BIPPART.

Witnesses:
   PAUL FLEISHMANN,
   CARL OTTE.